May 6, 1930.  A. H. WILSON  1,756,964
CLUTCH OPERATING MEANS
Filed Nov. 18, 1927   3 Sheets-Sheet 2
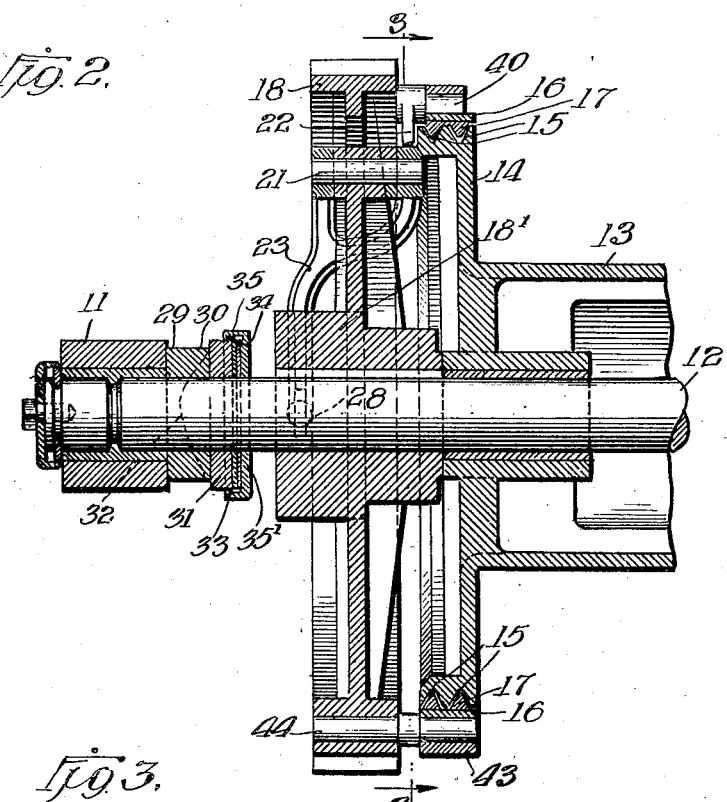
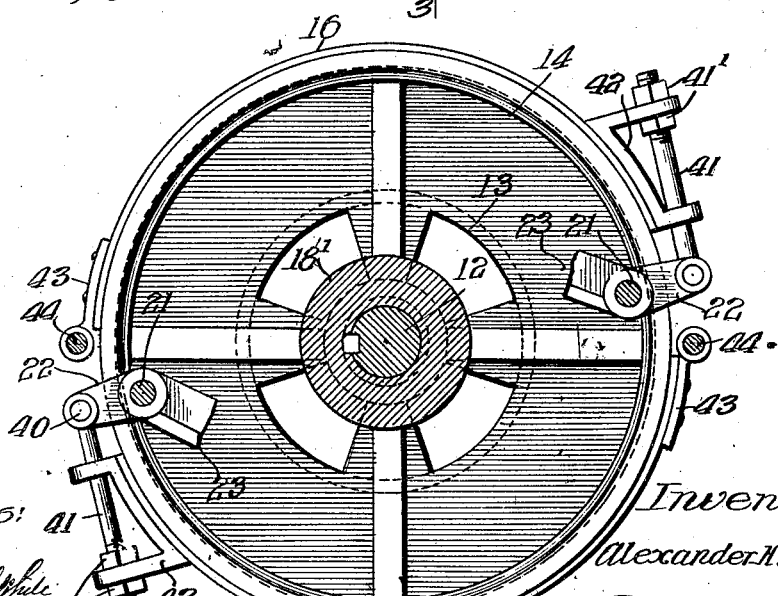

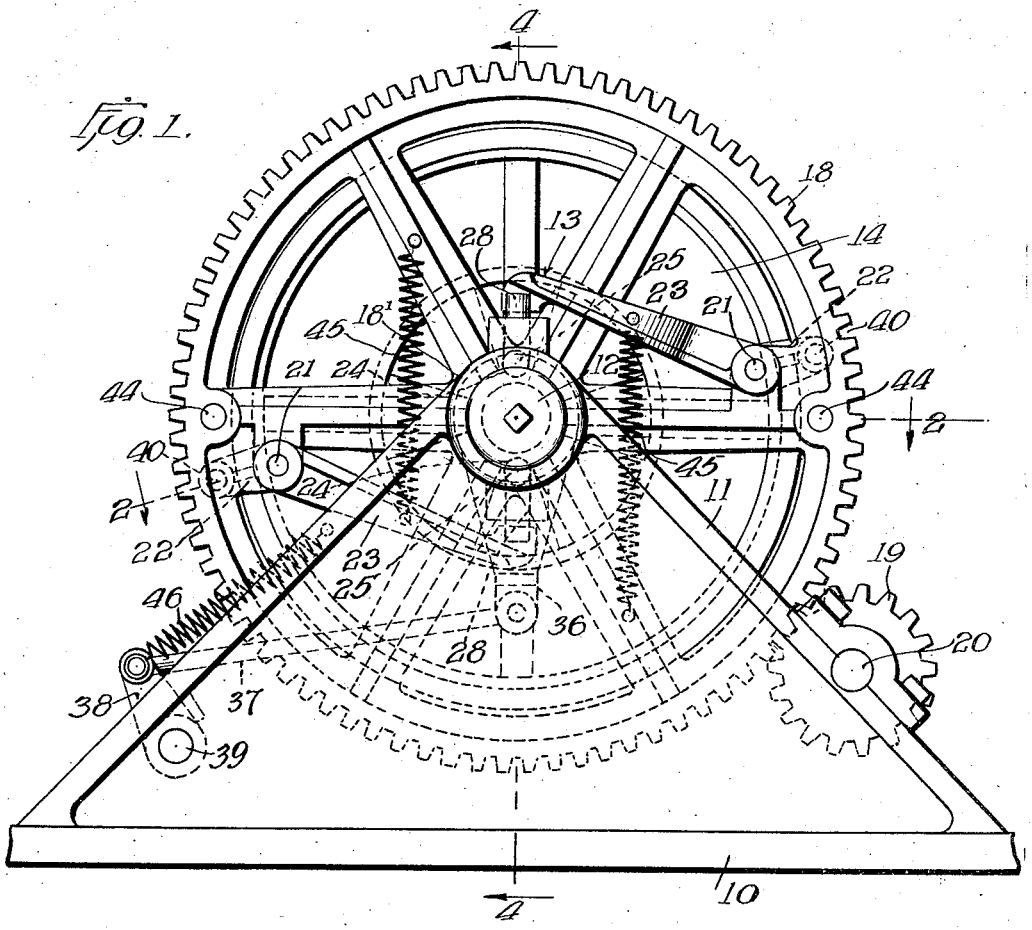
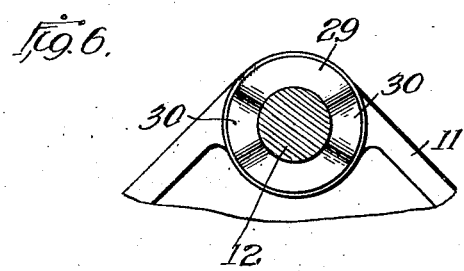

May 6, 1930.  A. H. WILSON  1,756,964
CLUTCH OPERATING MEANS
Filed Nov. 18, 1927   3 Sheets-Sheet 3
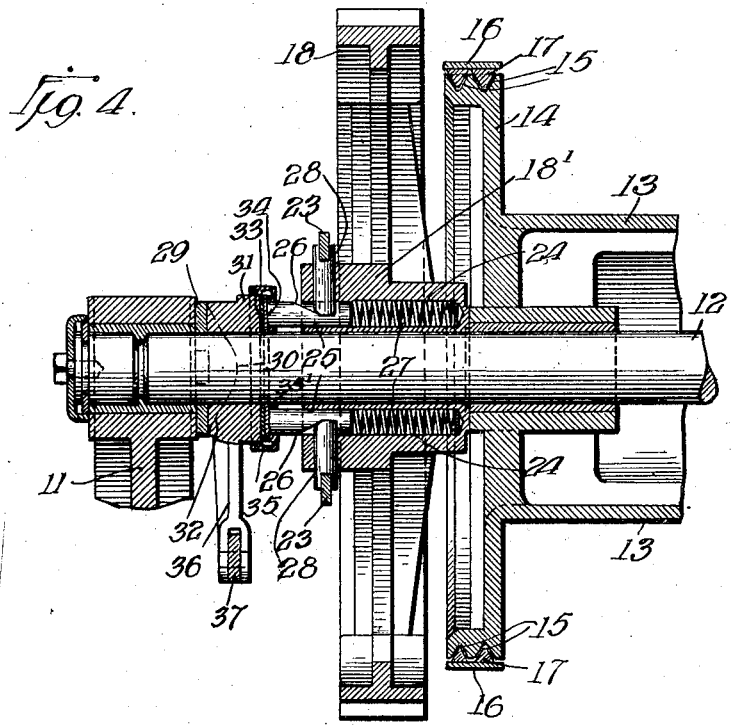
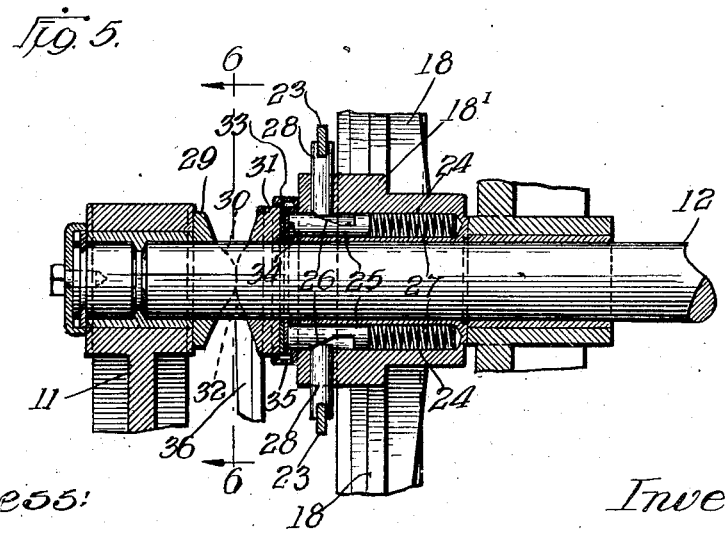
Witness:
Harry R. L. White.
Inventor:
Alexander H. Wilson
By Fisher, Towle, Clapp & Soans
Attys.

Patented May 6, 1930

1,756,964

UNITED STATES PATENT OFFICE

ALEXANDER H. WILSON, OF OAK PARK, ILLINOIS, ASSIGNOR TO THOMAS ELEVATOR COMPANY, OF CHICAGO, ILLINOIS, A CORPORATION OF ILLINOIS

CLUTCH-OPERATING MEANS

Application filed November 18, 1927. Serial No. 234,180.

This invention relates to improvements in clutch operating means chiefly designed for use in connection with that type of hoisting machines wherein a winding drum or reel carrying a rope or cable is loosely mounted on a shaft and is actuated and controlled by a friction band or bands carried by a continuously rotating wheel or disc and adapted to grip or release a head or flange of the drum. A machine of the type referred to is typically illustrated in Letters Patent to Wendell A. Barker No. 1,270,255, dated June 25, 1918. The principal object of my present invention is to provide an improved and simplified mechanism for effecting the application and release of the friction band or bands during and without interrupting the turning movement of the continuously rotating wheel or disc carrying the same, or when said continuously rotating wheel or disc is idle.

The subject-matter of the invention, its principle of operation, and the advantages inhering therein will be readily understood by persons skilled in the art from a consideration of the following detailed description, taken in connection with the accompanying drawings forming a part of this specification, wherein—

Fig. 1 is a side elevation of a hoisting machine embodying my present improvements;

Fig. 2 is a section on the line 2—2 of Fig. 1 showing the parts in the position wherein the clutch band is released;

Fig. 3 is a section taken on the line 3—3 of Fig. 2, showing the drum head or flange and the clutch bands encircling the same and a portion of the band operating mechanism;

Fig. 4 is a section at right angles to that of Fig. 2, on the line 4—4 of Fig. 1, also showing the parts in released position;

Fig. 5 is a fragmentary section in the same plane as Fig. 4, showing the parts in clutch applying position;

Fig. 6 is a sectional detail on the line 6—6 of Fig. 5, showing the stationary cam on the frame.

Referring to the drawings, 10 designates the machine bed, on opposite sides of which are parallel generally triangular upright frame members 11, in the upper ends of which is journaled a drum shaft 12. Loosely journaled on the shaft 12 is the winding drum or reel 13 formed as usual with an end flange or head 14. The periphery of the drum head 14 is preferably grooved, as shown at 15, to cooperate with a pair of substantially semicircular clutch bands or straps, each of which, in the preferred construction, consists of a steel tape 16 having secured to its inner surface a double V-shaped strip 17 of suitable friction material, such as filled canvas, or the like.

Keyed on the shaft 12 adjacent to the outer side of the drum head 14 is the hub 18' of a large spur gear wheel 18, which latter, in the instance shown, is continuously driven by a spur pinion 19 (Fig. 1) fast on a power-driven shaft 20 journaled in the side frames 11.

In the web of the large gear 18 at diametrically opposite points are journaled the fulcrum shafts 21 of a pair of elbow levers, each of which comprises a short outwardly and radially extending arm 22 and a relatively long inwardly extending arm 23 that overhangs the outer face of the gear wheel 18 and lies crosswise of the hub 18'. Since the clutch bands or straps and their operating devices are duplicates symmetrically grouped on opposite sides of the axis of the shaft 12, a description of one will suffice for both, it being understood that a single band or strap with a single set of operating devices might be employed if desired.

Referring to Figs. 4 and 5, the hub 18' of the large gear 18 is longitudinally recessed at diametrically opposite points, as shown at 24, and slidably fitted in each recess is a short rod 25 formed on its outer side with an inclined or cam face 26. Each sliding cam rod 25 is backed by a thrust spring 27 which normally urges the cam rod outwardly to the position shown in Fig. 4. The hub 18' is also apertured radially to receive a pair of sliding thrust rods 28, each of which at its inner end bears on the cam face 26 of the rod 25 and at its outer end is notched to straddle the lever arm 23.

Secured to the upper end of one of the side frames 11, and preferably encircling the shaft 12 is a stationary cam ring 29, which appears in face view in Fig. 6, that is formed with a pair of diametrically opposed cam protuberances 30; and loosely mounted on the shaft 12 just inwardly of the fixed cam ring 29 is a rotatable cam ring 31 that is formed on its outer face with a similar pair of diametrically opposed cam swells or protuberances 32. On the inner face of the cam ring 31 is an annular washer or wear ring 33, and next to the wear ring 33 is a rotatable wear ring 34 that is confined in place by an inwardly extending flange 35' on a lubricating gland 35 that embraces the cam ring 31. The flange 35' of the gland ring 35 is apertured to receive the outer ends of the sliding cam rods 25, said outer ends bearing against the washer 34. Fast on the rotatable cam ring 31 is an arm 36 that is connected by a link 37 (Fig. 1) to an arm 38 fast on a pedal-operated rock shaft 39 journaled in the frame 11.

The outer end of the short arm 22 of the lever carries a pivot pin 40 connected to an eye-bolt 41 adjustably mounted, as by nuts 41' in the arms of a metal saddle 42 that is rigidly attached to the free end of the clutch band or strap 16. The other end of said strap is anchored or dead-ended through a metal attachment clip 43 (Fig. 3) to the overhanging end of an anchor pin 44 mounted in the gear wheel 18.

Referring to Fig. 1, connected to each lever arm 23 is a pull spring 45 that is anchored at a suitable point on the gear wheel 18, and continuously pulls the lever in a direction to release the clutch band or strap. Also connected to the arm 38 is a pull spring 46 anchored to the frame 11 that urges the cam ring 31 to its idle position.

Briefly describing the operation, when the parts are in the relative positions illustrated in Figs. 1, 2, 3 and 4, the clutch bands or straps are slacked off under the pull of the springs 45, and the large gear 18 rotates idly. When it is desired to rotate the drum or reel, the operator rocks the shaft 39 through a suitable pedal or hand lever (not shown) thereby turning the cam ring 31 through a quarter turn, to approximately the position shown in Fig. 5. The thrust of the cam ring 31 on the outer ends of the sliding cam rods 25 forces the latter inwardly against the thrust of the springs 27, and the cam inclines 26 force the thrust rods 28 outwardly, and through the latter the levers are swung to positions in which the clutch bands or straps are gripped on the head of the drum so that the latter rotates with the large gear 18. When the rock shaft 39 is released, the spring 46 returns the cam ring 31 to its idle or internesting position relatively to the cam ring 29, and at the same time the thrust springs 27 return the sliding cam rods 25 to their idle position, whereupon the thrust rods 28 slide down the cam inclines 26 under the push of the lever arms 23 actuated by the pull springs 45, and the clutch bands or straps are slackened.

I claim—

1. In a clutch operating means of the type described, the combination of a shaft, a driven member on said shaft formed with a circular head, a driving member formed with a hub mounted on said shaft adjacent to said head, a clutch band anchored at one end to said driving member and overlying the periphery of said head, a lever fulcrumed on said driving member with one arm thereof attached to the other end of said clutch band, a sliding cam in the hub of said driving member movable axially of said shaft, a radial thrust rod slidably mounted in said hub with its inner end engaged with said cam and its outer end engaged with the other arm of said lever, manually operable means for effecting the working movement of said cam, a thrust spring in said hub for effecting the return movement of said cam, and a spring for moving said lever to band releasing position.

2. In a clutch operating means of the type described, the combination of a frame, a shaft journaled in said frame, a winding drum on said shaft, a driving member on said shaft adjacent to a head of said drum, a clutch band anchored at one end to said driving member and overlying the periphery of said head, a lever fulcrumed on said driving member with one arm thereof attached to the other end of said clutch band, a sliding cam mounted on said driving member to move axially of said shaft into and out of thrust relation to the other arm of said lever, a fixed cam on said frame, a rotatable cam cooperating with said fixed cam to effect a working movement of said sliding cam, a spring for effecting the return movement of said sliding cam, and a spring for moving said lever to band releasing position.

3. In a clutch operating means of the type described, the combination of a frame, a shaft mounted in said frame, a driven member on said shaft formed with a circular head, a driving member formed with a hub mounted on said shaft adjacent to said head, a clutch band anchored at one end to said driving member and overlying the periphery of said head, a lever fulcrumed on said driving member with one arm thereof attached to the other end of said clutch band, a sliding cam in the hub of said driving member movable axially of said shaft, means actuated by said cam for imparting a thrust to the other arm of said lever, a fixed cam on said frame, a rotatable cam loose on said shaft cooperating with said fixed cam to effect an inward movement of said sliding cam, a thrust spring in said hub for effecting outward movement of said sliding cam, and a spring for moving said lever to band releasing position.

4. In a clutch operating means of the type described, the combination of a frame, a shaft mounted in said frame, a driven member on said shaft formed with a circular head, a driving member formed with a hub mounted on said shaft adjacent to said head, a clutch band anchored at one end to said driving member and overlying the periphery of said head, a lever fulcrumed on said driving member with one arm thereof attached to the other end of said clutch band, a sliding cam in the hub of said driving member movable axially of said shaft, a radial thrust rod slidably mounted in said hub with its inner end engaged with said cam and its outer end engaged with the other arm of said lever, a fixed ring cam on said frame encircling said shaft, a rotatable cam loose on said shaft cooperating with said fixed cam to effect an inward movement of said sliding cam, a thrust spring in said hub for effecting outward movement of said sliding cam, and a spring for moving said lever to band releasing position.

ALEXANDER H. WILSON.